April 19, 1938.　　　T. R. PRIDDY　　　2,114,457
STEMMING MACHINE
Filed Nov. 16, 1934　　　4 Sheets-Sheet 1
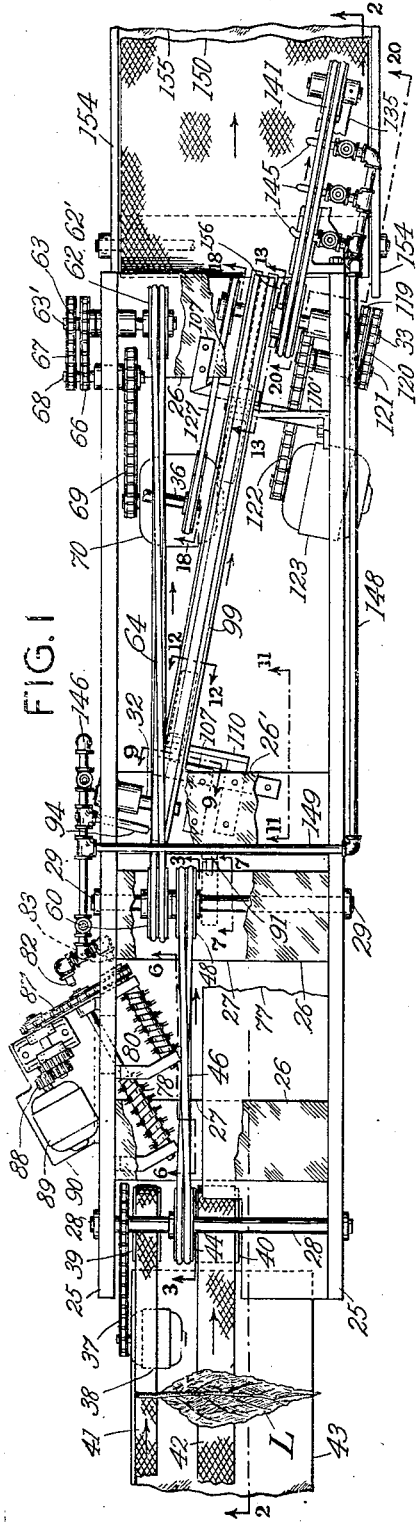
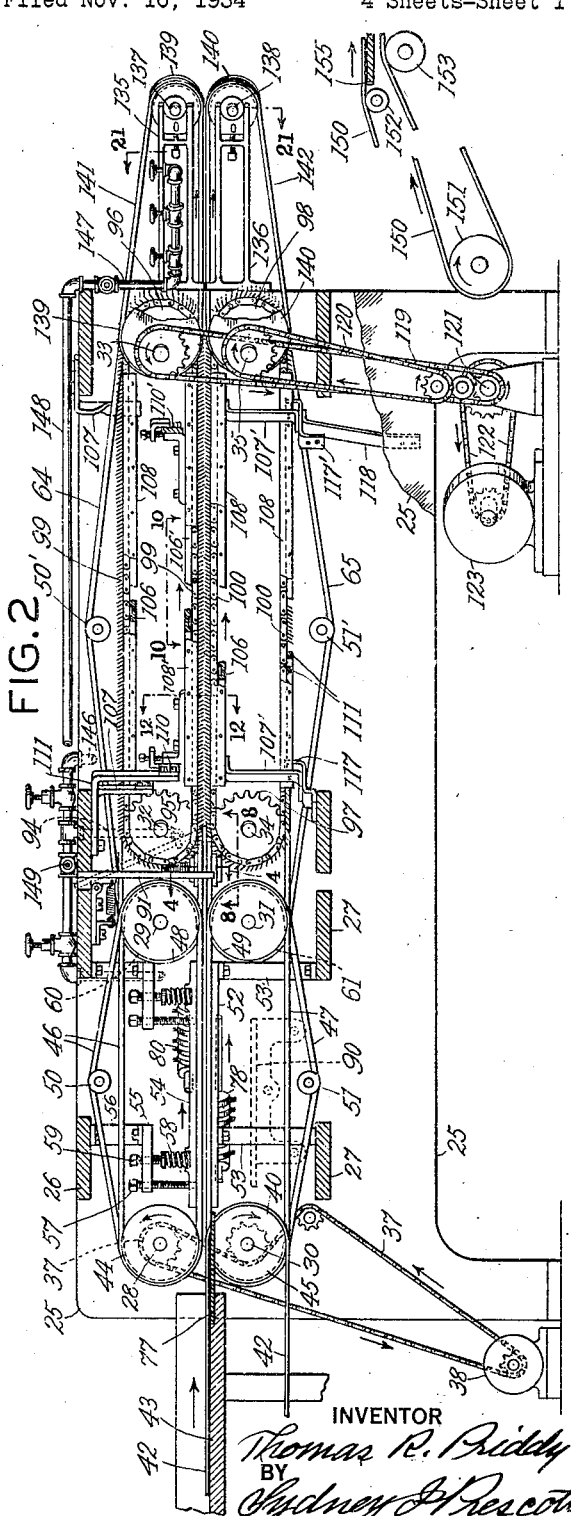
INVENTOR
Thomas R. Priddy
BY Sydney P. Prescott
ATTORNEY April 19, 1938. T. R. PRIDDY 2,114,457
STEMMING MACHINE
Filed Nov. 16, 1934 4 Sheets-Sheet 2
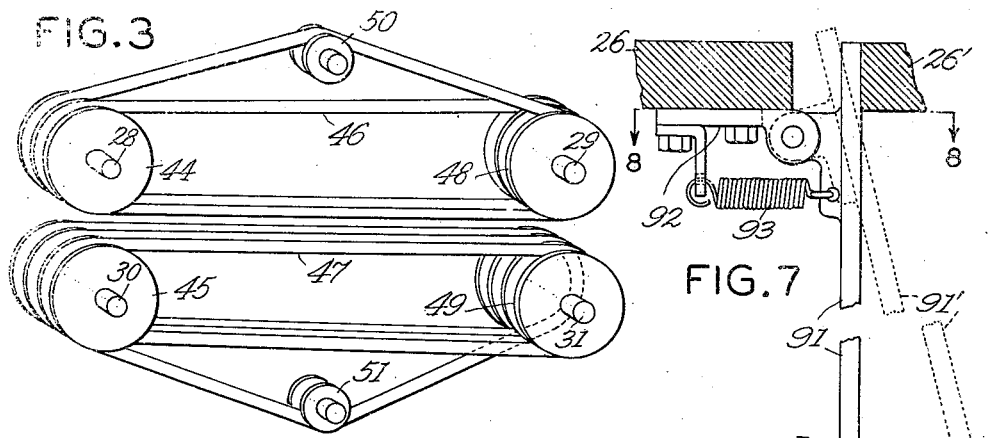
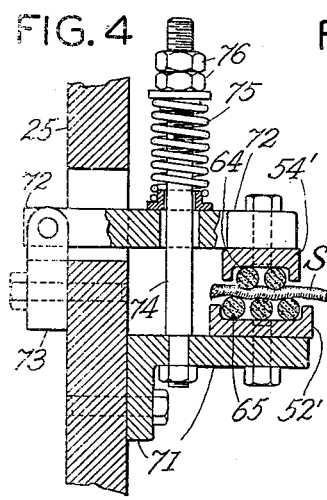
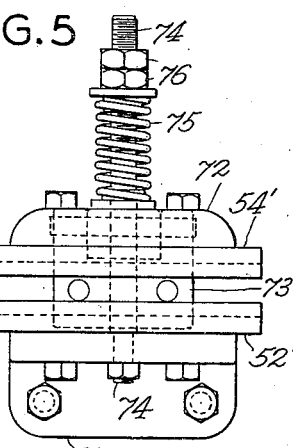
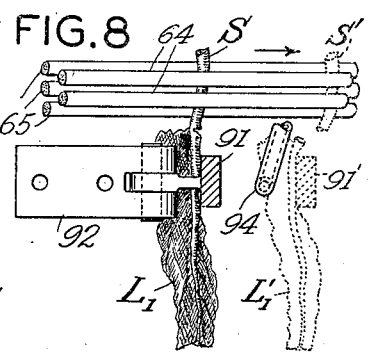
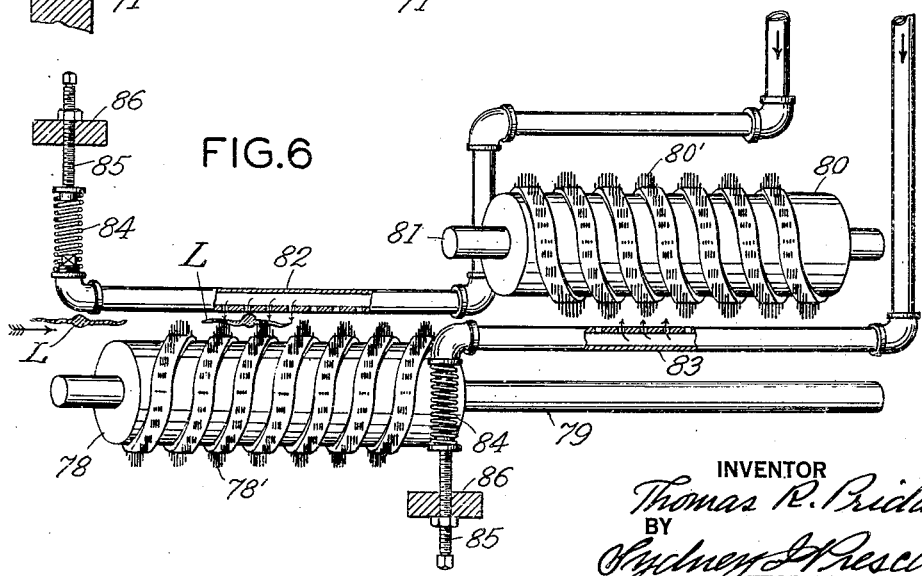
INVENTOR
Thomas R. Priddy
BY
Sydney J. Prescott
ATTORNEY April 19, 1938. T. R. PRIDDY 2,114,457
STEMMING MACHINE
Filed Nov. 16, 1934 4 Sheets-Sheet 3
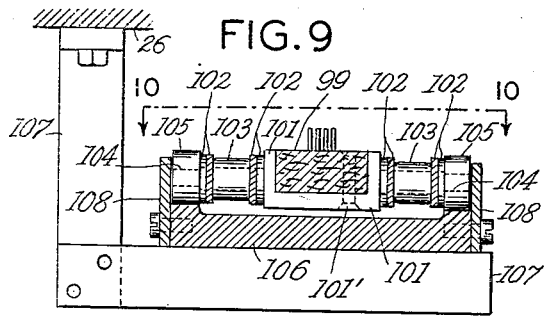
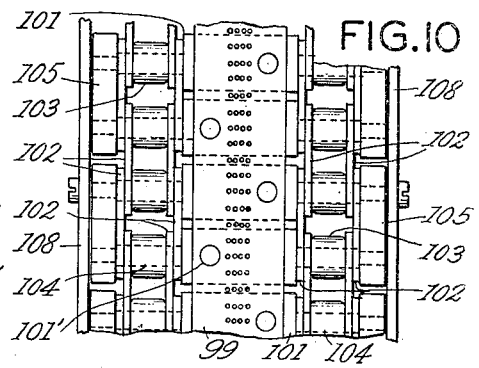
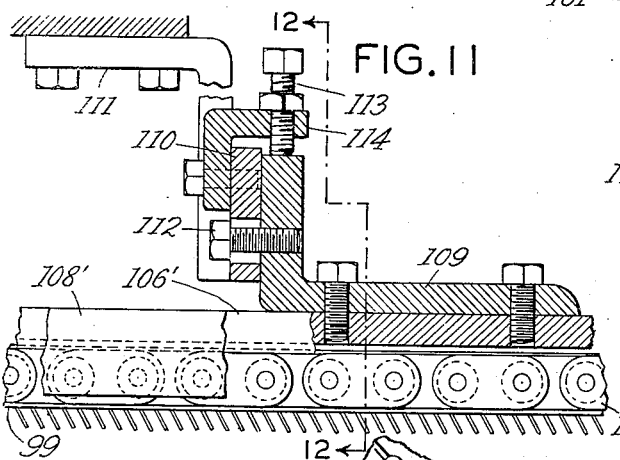
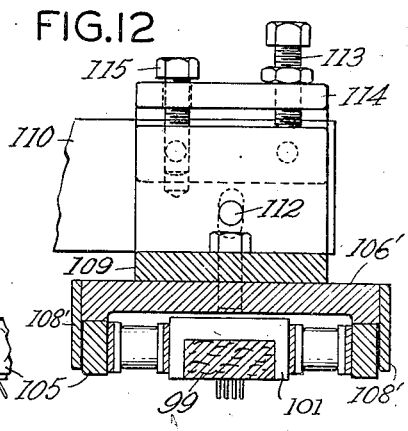
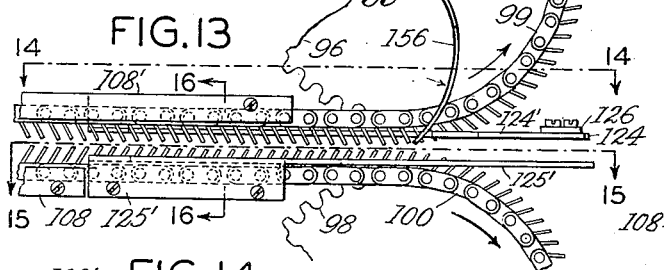
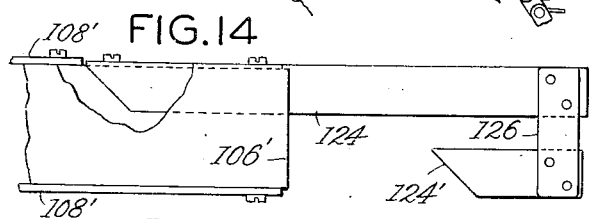
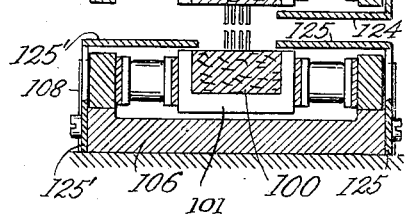
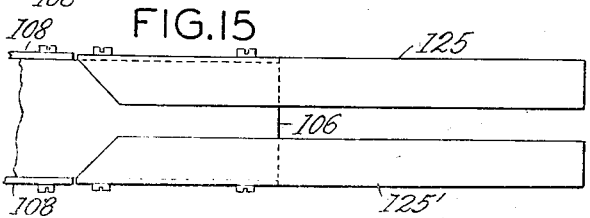
INVENTOR
Thomas R. Priddy
BY
Sydney Prescott
ATTORNEY April 19, 1938.　　　T. R. PRIDDY　　　2,114,457

STEMMING MACHINE

Filed Nov. 16, 1934　　　4 Sheets-Sheet 4

INVENTOR
Thomas R. Priddy
BY Sydney S. Prescott
ATTORNEY

Patented Apr. 19, 1938

2,114,457

UNITED STATES PATENT OFFICE 2,114,457

STEMMING MACHINE

Thomas R. Priddy, Richmond, Va., assignor, by mesne assignments, to The American Tobacco Company, New York, N. Y., a corporation of New Jersey Application November 16, 1934, Serial No. 753,379

33 Claims. (Cl. 131—57)

This invention relates to stemming machines and is particularly designed to improve stemming machines of the general type disclosed in Patent No. 1,986,781, granted January 1, 1935, on the application of Charles G. Maxwell, for an improvement in Tobacco stemming machines, though a number of features of the invention are useful in connection with other types of stemmers. In this type of machine, stem gripping means and endless stripping means traveling in diverging paths strip the leaf. This machine was characterized by smooth, continuous operation, great capacity and low percentage of dropped leaves. Occasionally, however, due to a weak or broken stem or some other cause, the stem or a portion of it is left in the endless stripping means.

It is therefore an object of the invention to still further reduce the number of unstemmed leaves delivered from the machine, and for this purpose auxiliary stem pulling means for pulling from the stripping means any stems left in the stripping means after the main stemming operation are provided.

The machine of the patent referred to employs sets of opposed cables carrying the leaves by their butts past suitable butting and main stripping units, the main stripping unit consisting of opposed runs of endless carding traveling in a path diverging from a set of cables.

Another object of the invention is to provide improved mounting of the carding, and also to provide a mounting of the card clothing which will avoid strains in the card belts.

Another feature of the invention is to render this type of machine simpler and more efficient by the mounting of the two sets of cables operating past the butter and main stripper respectively in parallelism, which simplifies the drives and facilitates the transfer of the leaves from one set to the other. It is also an object of the invention to improve the supporting and adjusting means which guide and support these cables and the stripping means and determines the gripping pressure thereof on the stems and leaves, so that the pressure and relative spacing of these parts may readily be adjustable to meet conditions.

It is a further object to provide an improved butt stripping mechanism which among other things will produce relatively large scraps.

Further objects are to provide additional means for separating broken or dropped leaves at various points in the stemming operation from properly stemmed leaves or leaves undergoing a normal passage through the machine to reduce the number of unstemmed leaves to be sorted by hand; and to provide supplementary doctoring and clearing elements to separate leaves and leaf particles from the stripping means.

With these and other objects not specifically mentioned in view, the invention consists in certain constructions and combinations which will be hereinafter fully described and then particularly pointed out in the claims hereunto appended.

In the accompanying drawings, in which like characters of reference indicate the same or like parts:

Fig. 1 is a plan view of the improved stemming machine;

Fig. 2 is a sectional elevation of Fig. 1, on line 2—2 thereof;

Fig. 3 is a detail perspective view of one set of gripper bands on line 3—3 of Fig. 1, showing the arrangement of the cables;

Fig. 4 is a sectional side elevation of a set of gripper cables on line 4—4 of Fig. 2;

Fig. 5 is an end elevation of Fig. 4;

Fig. 6 is a side elevation of the butting mechanism on line 6—6 of Fig. 1;

Fig. 7 is a detail side elevation of a loose-leaf knock-out, at line 7—7 of Fig. 1;

Fig. 8 is a plan view seen from line 8—8 of Fig. 7;

Fig. 9 is a detail view in end elevation partly in section of the stemming chain and one of its guides;

Fig. 10 is a detail plan view of the stemming chain, on line 10—10 of Figs. 2 and 9;

Fig. 11 is a detail view in side elevation partly in section on line 11—11 of Fig. 1;

Fig. 12 is an end elevation partly in section on line 12—12 of Fig. 11;

Fig. 13 is a view in side elevation on line 13—13 of Fig. 1;

Fig. 14 is a top view of the upper stripper elements, from line 14—14 of Fig. 13;

Fig. 15 is a top view of the lower stripper elements from line 15—15 of Fig. 13;

Fig. 16 is an enlarged end view on line 16—16 of Fig. 13;

Figure 20:
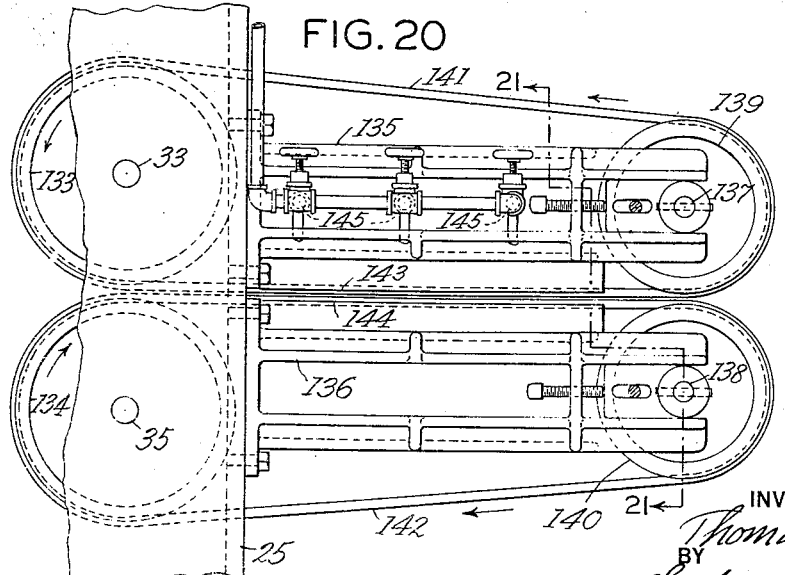
Figure 21:
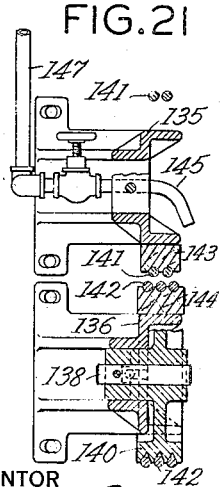

Fig. 20 is a detail side elevation of the broken-leaf delivery belts, on line 20—20 of Fig. 1; and Fig. 21 is an end elevation partly in section of the same, on line 21—21 of Figs. 2 and 20.

Generally speaking, in carrying the invention into effect, there is provided, endless means for forwarding the leaves to be stemmed, endless moving card belts having opposed leaf engaging runs traveling in a path diverging from that of said forwarding means to strip the leaves from the stems held in said forwarding means, and preferably a leaf puller coacting with said endless carding to pull out stems left in the carding after the stripping operation. In a preferred form such as that illustrated, the endless forwarding means consists of a pair of opposed flexible endless belts each of which is looped a plurality of times to provide a plurality of opposed parallel runs for gripping the stems. In one of the forms of the invention contemplated the endless moving card belts are mounted on endless chains arranged to support the carding on the pitch line of the chain to avoid strains in the card belts. In one of the best forms contemplated an additional set of endless forwarding means advances the leaves to the first mentioned forwarding means, and mechanism for stripping the butt portions of the leaves advanced by said additional means are provided, including a card roll and a relatively stationary element or guide holding butts of the leaves against said roll.

The means and parts selected for illustration may be widely varied in construction within the scope of the claims, for they are but one of many possible concrete embodiments of the same. The invention therefore is not to be restricted to the precise details of the machine shown and described; furthermore, certain parts of the machine are capable of use independent of other parts and such independent use is contemplated.

Referring now to Figs. 1 and 2 of the drawings, the leaves are fed into the machine by belts 41 and 42 running over a table 43, these belts being supported on pulleys 39 and 40 driven by a shaft 30 through a chain 37 from a motor 38. The shaft 30 is supported in the main side frames 25 of the machine, held together by upper and lower tie plates 26 and 27, and these side frames also carry the various other horizontal cross shafts 28, 29, 31, 32, 33, 34, 35, and 36.

Leaves fed by the operator of the machine onto the belts 41 and 42 are carried into the endless leaf advancing cables 46 and 47 which are guided on sheaves 44, 45, 48, and 49 on the shafts 28, 29, 30, and 31.

As explained in detail in the Maxwell patent, above referred to, a plurality of staggered leaf gripping cable runs are provided for flexing or crimping the leaf stems between them, the cables being made of twisted metal wire because of the better gripping surface resulting. In the prior construction, a plurality of cables were provided above and below the leaves to give the plurality of gripping runs. It has been found that the same results can be obtained with less cable expense by looping one cable a plurality of times so that two or three or more gripping runs can be employed with only one cable splice. It should be understood that the splice is one of the most expensive features of the cable and often the life of the cable is determined by the life of the splice. Thus the cable 46 is wound twice over sheaves 44 and 48 and crossed over a guide and idler sheave 50 (Fig. 3). Similarly the cable 47 is looped three times over sheaves 45 and 49 and crossed over idler sheave 51.

The operating runs of the lower cable are supported and guided by a grooved bar 52 carried by brackets 53 on plates 27. The operating runs of the upper cable are held against the stems of the leaves by a similar grooved bar 54 carried by blocks 55 on brackets 56 secured to plates 26 by suitable screws 57. Coil springs 58 adjustably compressible by means of screws 59 serve to provide a predetermined working pressure between the operating runs of the upper and lower cables.

These springs permit the cables to yield to large stems. The cables just referred to serve to carry the leaves past the butting mechanism, presently to be described, and thereafter deliver the leaves into a second set of leaf advancing cables 64 and 65 which grip the butted ends of the leaves during the stripping operation. These cables 64 and 65 are mounted on sheaves 60 and 61 on shafts 29 and 31 and on sheaves 62 and 62' on shafts 63 and 63' respectively, which cables are similarly looped, and guided on idler sheaves 50' and 51' in the same manner, as shown in Fig. 3. The shafts 63 and 63' are suitably driven by chains 66 and 67 from a shaft 68 through chain 69 from a motor 70. The operating runs of these cables are urged toward each other as described in connection with cables 46 and 47 by grooved bars 52" and 54", the former of which is supported by a bracket 71 and the latter of which is supported by an arm 72 pivoted on a bracket 73. A bolt 74 on the bracket 71 passes through the arm 72 and carries a coil spring adjustably compressed by nuts 76 to provide the adjustable pressure of the cable on the leaves.

The butts of the stems projecting from the cables 46 and 47 are stripped by mechanism best shown in Fig. 6, while the main portion of the leaves are supported in horizontal position on a plate 77. As the leaves are advanced by the cables 46 and 47 the butts pass by the card rolls 78 and 80 having spirally arranged carding 78' and 80', the spiral arrangement of which serves to aid in feeding the butts through the machine. The leaf portions at the butt are held in the range of action of the card rolls by means of stationary guide elements 82 and 83 which are yieldingly pressed toward said rolls by springs 84, the pressure of which is adjustable by means of a screw 85 passing through brackets 86 on the side frames of the machine. The guide elements 82 and 83 are made in the form of air pipes, perforations in which face the carding so that a blast of air may be employed to further press the butt portions of the leaves against the carding. The construction just described differs from the form shown in the Maxwell patent above referred to, in eliminating the passing of the butts between two simultaneously operating opposed rolls. I find that the present construction results in larger scrap, a considerable advantage in machines of this type. The rolls 78 and 80 are suitably mounted on shafts 79 and 81 and are driven by chains 87 through a gear reduction mechanism 88 from a motor 89 mounted on a shelf outside the side frame 25 (Fig. 1).

As the leaves leave the cables 46 and 47 they engage a leaf knocker comprising a vertical rod 91 (Figs. 7 and 8) designed to knock out loose leaves which are broken or insecurely gripped by the stemming cables 64 and 65. This eliminates such leaves from the good strip and insures against improperly stripped leaves. The rod 91 is pivoted on a bracket 92 and is held in vertical position against the tie plate 26' by a spring 93. Properly gripped leaves merely push the rod into the dotted position 91' shown in Fig. 7, and pass by. A broken or loose leaf will be detached by this knocker or by the combined action of the knocker and a blast nozzle 94 which serve to blow the leaf down to a suitable container below.

The main stripping elements consist of endless carded belts 99 and 100 secured in channel shaped blocks 101, (Figs. 9 and 10), connected in endless chain formation by links 102 supported with rollers 103 on laterally projecting pins 104 set in the blocks 101, the outer ends of the pins being joined in pairs by blocks 105.

The operating runs of belts 99 and 100 are supported and guided in predetermined spaced relationship for proper stripping by guide bars 106 supported by brackets 107 and 107' and by side plates 108 and 108', secured on the bars. The lower run of the belt 99 is similarly guided by a bar 106' (Figs. 11 and 12), secured to a bracket 109 adjustably supported by the bar 110 on another bracket 111 on the tie plate 26. The brackets are adjustably secured by screws 112 passing through slots in bars 110, after their position has been adjusted by set screws 113 in brackets 114. This adjustment is located by a screw 115. The lower run of the belt 100 is guided by rails 116 conveniently supported by brackets 107' and 117 and 117'. A bracket 118 reinforces the bracket 117'.

The endless chains carrying the stemming belts are trained over sprockets 95, 96, 97, and 98 mounted on shafts 32, 33, 34, and 35 respectively, the rollers 103 of the endless chains entering the spaces between the sprocket teeth; and the shafts are set at an angle to the longitudinal axis of the machine so that the stripping belts travel in a path diverging from the path of the leaf-advancing cables 64 and 65, as shown in Fig. 1.

It will be noted that the cables 64 and 65 travel in a path parallel with, and laterally offset from, the path of cables 46 and 47, the offset being sufficient to cause cables 64 and 65 to grip the butted portions of the stems. The arrangement of the gripping cables 46 and 47 in parallelism with the cables 64 and 65 simplifies driving and provides for a square grip on the stem butts. It is noted that because of the inclined arrangement of the stripper belt supporting shafts, the stripper belt travels in a single vertical plane somewhat simplifying the construction and eliminating lateral bending of the belt.

As will be seen from Figs. 12 and 16, the card belts are supported in the channels of the blocks 101 substantially at the pitch line of the chains carrying said belts, so that there is a minimum amount of strain and stretch on the belt as the same passes around the sprockets, a feature greatly prolonging the life of the belts where the belts are fixed to the chain links, as they are here, by rivets 101'. When it is desired to substitute another card belt the rivets are knocked out and another belt is riveted to the same chain links. In connection with the card belts 99 and 100 and the gripper cables 64 and 65, it is noted that these belts and cables travel at a substantially greater speed than the cables 46 and 47, resulting in a separation of the stems as described in the above mentioned Maxwell patent.

The stripped leaf portions and occasional small pieces of leaves have a tendency to stick to the carding and continue in the same past the delivery end of the belts. To counteract this, stripper elements or doctor blades 124, 124', 125, and 125' (Figs. 13 and 16) are provided. These blades lie close to the surface of the card belts adjacent the carding and act to get under leaves or leaf portions in the carding and, at the point where the carding passes around the pulleys transversely of these blades, to remove these leaf portions.

Figure 17:
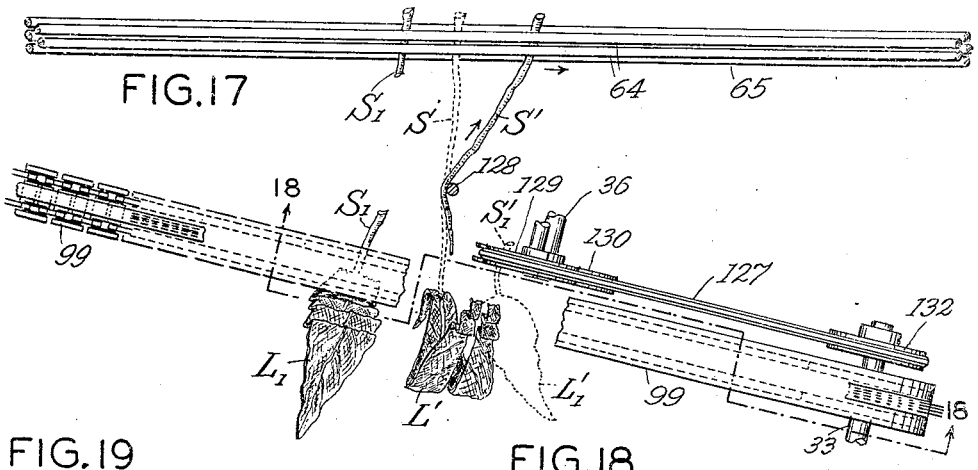
Fig. 17 is a detail plan view of a broken-leaf ejector.
Figure 19:
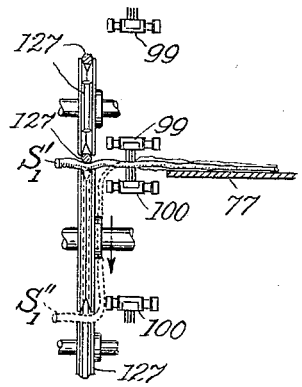
Fig. 19 is a detail end elevation on line 19—19 of Fig. 17.
Figure 18:
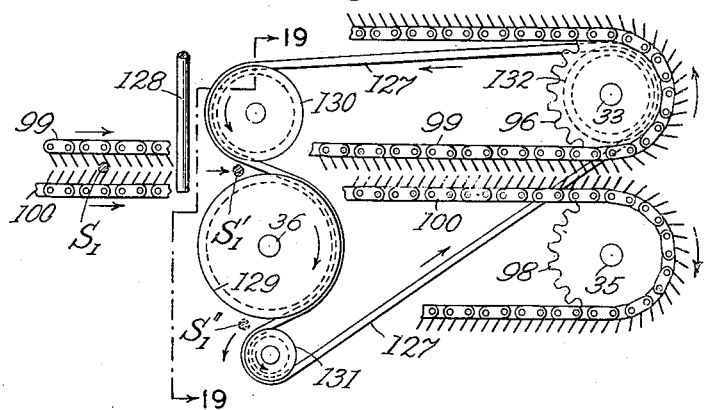
Fig. 18 is a detail side elevation on line 18—18 of Figs. 1 and 17.

To remove from the endless stripping belts 99 and 100, stems of leaves which were insufficiently gripped by the stem pulling cables 64 and 65 or which had stems broken too close to the stripper belts to be properly gripped by said cables, a secondary stem puller is provided as shown in Figs. 17 to 19. This stem puller consists of an endless belt 127 extending in a plane alongside the stripper belts. This belt 127 is guided around a pulley 129 by means of guide pulleys 130 and 131 placed above and below the main pulley 129 and by drive pulley 132 on the shaft 33. A stationary pin 128 is placed ahead of and offset toward cables 64 and 65 from the nipping point between the pulley 129 and the belt 127 as shown in Fig. 17. Thus it will be seen from Fig. 17 that a normally stripped stem S will be pulled around the guard pin 128 and pass on as shown at S' in Fig. 17. The stem S1 of a broken leaf L1 will pass by pin 128 and will be carried into the nip of belt 127 as shown at S'1, in Fig. 18 downward to S1, where the stem is released. The belt 127 and pulley 129 constitute gripping elements traveling in a path at an angle to or diverging from that of the stripping belts and thus pull the stem in a downward direction from the leaf in the same fashion that the cables 64 and 65 do with normal stems. This mechanism gives a second chance at stems not pulled out by cables 64 and 65 and thus reduces "drop leaves". In order to grip rather short projecting stem portions the belt 127 is placed as close to the carding as the chain carrying the same will permit.

Leaves broken too close to the stripping belts to have their stems pulled out by belt 127 and pulley 129 and also some unstemmed leaves which stick to the carding, will be carried along by the stripping belts. In order to deliver these leaves passing unstemmed through the machine, separately and to insure their removal from the carding, delivery belts 141 and 142 shown in Figs. 20 and 21 are provided. These delivery belts are suitably supported and driven on pulleys 133, 134, 139, and 140, the latter carried by brackets 135 and 136, through adjustable belt tensioning studs 137 and 138. The operating runs of these belts are held in proper gripping relationship by means of guide bars 143 and 144. Pipes 145 connected to the air supply 146 by pipes 147, 148, and 149 direct a blast of air on leaves delivered by the belts 141 and 142 and thereby eject any properly stemmed leaves entangled with the unstemmed leaves toward the middle of the wide delivery conveyor belt 150. The properly stemmed leaves carried along by the carding are somewhat crumpled up against the carding and hang down somewhat so that they are outside the range of action of the belts 141 and 142 and thus are delivered near the middle of the belt 150. Leaves, the stems of which were not pulled through the card belts, however, project far enough to be caught by said belts 141 and 142. Thus a separation is provided at this point between the properly stemmed and the unstemmed leaves. This is important because it decreases the likelihood of any unstemmed leaves being mixed with the stemmed leaves.

In order to insure proper relationship between the belts 141 and 142 and the stripping belts to secure the results just referred to, the pulleys 139 and 140 are shiftable along the shaft 33 and similarly the brackets 135 and 136 are made shiftable by slotting the holes through which their securing bolts pass.

The shafts 33 and 35 are driven by a motor 123 through a suitable driving connection including the chain 122, the sprocket carrying shaft 121 and the chains 119 and 120, as shown in Figs. 1 and 2.

The belt 150 runs over rollers 151, 152, and 153 carried by side frames 154 and is supported by a table 155 forming the top of the conveyor frame. This belt receives the great majority of the leaves passing through the machine, since the leaves which have their stems pulled out while in the card belts stick to the carding, and even leaves which are not very securely held by the carding are pushed along by the leaves behind.

To further insure clearing of the stemmed leaves from the card belts, flexible ejecting arms 156, which may be of stiff leather, are attached to a pulley hub on shaft 33 adjacent the operating runs of card belts 99 and 100 (Fig. 1), so that, as shown in Fig. 13, the arms 156 propel the leaves outwardly away from the carding. A similar set of arms, not shown, may be placed on the shaft 34.

Since the operation of the machine has been fully set forth in connection with the description of the several parts, for the sake of briefness and to avoid repetition, further description of the operation is omitted.

What is claimed is:

1. A tobacco stemming machine, comprising in combination means for gripping and forwarding leaves, endless moving stripping means having a leaf engaging run traveling in a path diverging from that of said forwarding means operating to strip the leaves from the stems held in said means, and a stem puller in parallelism with said endless means and acting to pull out in a downward direction stems left in unstemmed leaves in the endless means after the stripping operation.

2. A tobacco stemming machine, comprising in combination endless opposed twisted wire cables for gripping and forwarding leaves, endless moving stripping means having a leaf engaging run traveling in a path diverging from that of said forwarding means operating to strip the leaves from the stems held in said means, and a stem puller in parallelism with said endless means and acting to pull out in a downward direction stems left in unstemmed leaves in the endless means after the stripping operation.

3. A tobacco stemming machine, comprising in combination means for gripping and forwarding leaves, endless moving stripping means having leaf engaging portions traveling in a path diagonal to that of said forwarding means operating to strip the leaves from the stems held in said means, and a stem puller in parallelism with said endless means and acting to pull out in a downward direction stems left in unstemmed leaves in the endless means after the stripping operation, said puller comprising members having endless opposed leaf gripping surfaces traveling in a path diverging from that of the stripping means.

4. A tobacco stemming machine, comprising in combination endless moving stripping means having leaf engaging runs traveling in a rectilinear path, and a stem puller coacting with said endless means to pull out stems projecting from the endless means, said puller comprising a pulley wheel and an endless member passing around said wheel arranged to grip a projecting stem portion between the member and the wheel.

5. A tobacco stemming machine, comprising in combination means for gripping and forwarding leaves, endless moving stripping means having a leaf engaging portion traveling in a path diverging from that of said forwarding means operating to strip the leaves from the stems held in said means, a stem puller coacting with said endless means to pull out stems left in the endless means after the stripping operation, and a guard element arranged to prevent stripped stems held in said forwarding means from coming within the range of action of said puller.

6. A tobacco stemming machine, comprising in combination means for gripping and forwarding leaves, endless moving stripping means having a leaf engaging run traveling in a path diverging from that of said forwarding means operating to strip the leaves from the stems held in said means, and a stem puller in parallelism with said endless means and acting to pull out in a downward direction stems left in unstemmed leaves in the endless means after the stripping operation, said stripping means including traveling card belts having opposed leaf engaging runs.

7. A tobacco stemming machine, comprising in combination a primary set of endless members having opposed runs for forwarding tobacco leaves, means for stripping the butt portions of leaves forwarded in said primary set, a secondary set of endless members receiving and forwarding leaves from the primary set and gripping the stripped butts of the leaves, endless stripping elements having opposed leaf engaging runs traveling in a path diverging from that of said secondary set for stripping the leaves from the stems held in said members, and means coacting with said endless elements to remove stems not retained in the secondary set of endless members from said elements.

8. A tobacco stemming machine, comprising in combination a primary set of endless members having opposed runs for forwarding tobacco leaves, means for stripping the butt portions of the leaves forwarded in said primary set, a secondary set of endless leaf forwarding members receiving leaves from the primary set and gripping the stripped butts of the leaves, said secondary set being laterally offset from but parallel with the primary set, and endless stripping elements having opposed leaf-engaging runs traveling in a path diverging from that of said secondary set for stripping the leaves from the stems held in said members.

9. A tobacco stemming machine, comprising in combination a primary set of endless members having opposed runs for forwarding tobacco leaves horizontally, means for stripping the butt portions of the leaves forwarded in said primary set, a secondary set of endless leaf forwarding members receiving leaves from the primary set and gripping the stripped butts of the leaves, said secondary set being laterally offset from but parallel with the primary set, stripping mechanism for stripping the leaves from the stems held in said members, pulleys carrying said primary set of endless members and said secondary set of endless members, pulleys at the receiving end of the secondary set rotating on the same axis as the pulleys at the delivery end of the primary set.

10. A tobacco machine comprising in combination a primary endless means for gripping and forwarding tobacco leaves horizontally, means for stripping the butt portions of leaves forwarded in said primary means, a primary set of endless members receiving the leaves from the primary means and gripping the stripped butts of the leaves and forwarding the same, a set of endless stripping elements having opposed leaf-engaging runs traveling in a path diverging at an acute angle from that of said primary set for stripping the leaves from the stems, said primary set being arranged in parallelism with the primary endless means.

11. In a tobacco stemming machine, leaf forwarding means, a plurality of endless members having runs arranged in opposed sets with the runs in one set offset relative to the runs in the other set to grip and flex or crimp the leaf stems transversely, guide plates supporting the operating runs of said members against the tendency of the stems to separate the same, and cooperating mechanism for adjustably mounting said guides to regulate the spacing and gripping pressure of said runs, said mechanism including pivoted arms carrying said guide plates.

12. In a tobacco stemming machine, leaf forwarding means, a plurality of endless members having runs arranged in opposed sets with the runs in one set offset relative to the runs in the other set to grip and flex or crimp the leaf stems transversely, guide plates supporting the operating runs of said members against the tendency of the stems to separate the same, and cooperating mechanism for adjustably mounting said guides to regulate the spacing and gripping pressure of said runs, said mechanism including springs urging said guides toward the leaf stems, and devices for regulating the pressure of said springs.

13. In a tobacco stemming machine, stemming mechanism including a pair of opposed endless chains each comprising pivotally connected links arranged to provide parallel runs, an endless card belt of flexible material mounted on each of said chains, and a guide track for said runs, said links consisting of laterally spaced sprocket engaging elements, a connecting pin between said elements for supporting said belt, and lateral extensions from said elements arranged to be guided by said track.

14. In a tobacco stemming machine, stemming mechanism including a pair of cooperating endless members, stripping elements carried by said members, pulleys mounting said members to provide opposed parallel runs, and means for removing the tobacco leaves and leaf portions from said elements at the end of said runs comprising flat doctor blades extending between said runs in close proximity to said elements and past which the elements travel in passing around said pulley, to remove leaves and leaf portions from said stripping elements.

15. In a tobacco stemming machine, stemming mechanism including a pair of cooperating endless stripping elements having opposed parallel stripping runs, from one end of which the leaves are delivered, and means for removing tobacco leaves and leaf portions from said stripping elements comprising ejector arms, and means mounting said ejector arms for movement against said leaves in the direction of delivering movement thereof.

16. In a tobacco stemming machine, stemming mechanism including a pair of cooperating endless stripping elements having opposed parallel stripping runs, from one end of which the leaves are delivered, and means for removing tobacco leaves and leaf portions from said stripping elements comprising flexible ejector arms, and means mounting said ejector arms for rotary movement against said leaves in the direction of delivering movement thereof.

17. In a tobacco stemming machine, the combination with traveling means for gripping and forwarding leaves, moving stripping means traveling in a path diverging from that of the leaf forwarding means, and a conveyor on the opposite side of said stripping means from said forwarding means arranged in predetermined spaced relation to said stripping means to receive any unstemmed leaves not pulled into said stripping means by said leaf forwarding means, and thus separate the same from the relatively shorter crumpled stemmed leaves carried thereby.

18. In a tobacco stemming machine, the combination with traveling means for gripping and forwarding leaves, endless moving stripping means traveling in a path diverging from that of the leaf forwarding means, and a conveyor on the opposite side of said stripping means from said forwarding means to receive any unstemmed leaves not pulled into said stripping means by said leaf-forwarding means, and thus separate the same from stemmed leaves carried thereby, said conveyer comprising endless belts having opposed leaf engaging runs overlapping and extending beyond and to one side of said stripping means.

19. In a tobacco stemming machine, the combination with means for advancing a succession of tobacco leaves, of stripping means operating on said leaves comprising rolls arranged in tandem alongside said forwarding means, one on one side of the plane of the leaves and the other on the other side of the plane of the leaves, and means coacting with each of said rolls for holding the leaves in the range of action thereof, said means comprising relatively stationary plates.

20. In a tobacco stemming machine, the combination with means for advancing a succession of tobacco leaves, of stripping means operating on said leaves comprising rotating rolls arranged in tandem alongside said forwarding means, one on one side of the plane of the leaves and the other on the other side of the plane of the leaves, stripping elements on said rolls, and members coacting with each of said rolls for holding the leaves in the range of action of said stripping elements, and yielding mounts for said members urging the same toward said rolls.

21. In a tobacco stemming machine, the combination with means for advancing a succession of tobacco leaves, of moving stripping means on one side of the plane of the leaves, and pneumatic means directing air against the leaves to hold them in the range of said stripping means.

22. In a tobacco stemming machine, the combination with means for advancing a succession of tobacco leaves with their butt portions exposed, butt stripping means operating on said butt portions comprising rotary stripping rolls arranged in offset relation alongside of said forwarding means, stripping elements on said rolls to engage opposite sides of the butts, and relatively stationary means holding said butt portions in the range of action of said rolls.

23. In a tobacco stemming machine, the combination with means for gripping tobacco leaves and continuously forwarding the same, of stripping means moving in a path diverging from the forwarding means for stripping the leaf portions from the leaves held in said forwarding means, and mechanism acting on the leaves in said forwarding means to eject improperly gripped or broken leaves prior to the stripping operation.

24. In a tobacco stemming machine, the combination with primary means for advancing a succession of tobacco leaves with their butt portions exposed, of a butter operating to strip said butt portions, secondary advancing means receiving leaves from said first mentioned advancing means and gripping said leaves by the stripped butt portions thereof, a main stripper for stripping the remainder of the leaves from the stem while held in the secondary means, and means adjacent the transfer position from one advancing means to the other for ejecting improperly held or broken leaves.

25. In a tobacco stemming machine, the combination with primary means for advancing a succession of tobacco leaves with their butt portions exposed, of a butter operating to strip said butt portions, secondary advancing means receiving leaves from said first mentioned advancing means and gripping said leaves by the butt portions thereof, a main stripper for stripping the remainder of the leaves from the stem while held in the secondary means, and means adjacent the transfer position from one advancing means to the other for ejecting improperly held or broken leaves, said ejecting means including a bar, and means yieldingly urging said bar into the path of the leaves.

26. In a tobacco stemming machine, the combination with primary means for advancing a succession of tobacco leaves with their butt portions exposed, secondary advancing means receiving leaves from said first mentioned advancing means, a main stripper for stripping the leaves from the stem while the stem is held in the secondary means, and means adjacent the transfer position from one advancing means to the other for ejecting improperly held or broken leaves, said ejecting means including devices directing an air blast on the leaves.

27. A tobacco stemming machine, comprising in combination a primary set of cables having opposed runs for forwarding tobacco leaves horizontally, a secondary set of cables receiving leaves from the primary set, means for stripping the butt portions of said leaves forwarded in said primary set including a card roll and a relatively stationary plate holding the butts against said roll, endless card belts having opposed leaf engaging runs traveling in a path diverging from that of said secondary set of cables for stripping the leaves from the stems held in said cables, guide plates supporting the leaf engaging runs of said cables, tracks supporting the operating runs of said endless carding, means for adjusting said plates and tracks respectively to control the space between said operating runs, a stem puller coacting with said endless carding to pull out stems left in the carding by the secondary cables including stem gripping means traveling in a path diverging from that of the endless carding, means acting on the leaves in said secondary cable prior to entering said endless carding to eject broken stems or loosely held leaves, and means for stripping and delivering stemmed leaves and leaf pieces from the endless carding.

28. In a tobacco stemming machine, the combination with means for gripping and forwarding tobacco leaves, of opposed, endless moving stripping members traveling in a diverging path relative to said means arranged to admit therebetween leaves forwarded by said means and coacting to strip the laminae from the stems of leaves held in said means, and an auxiliary stem puller including stem gripping members having a portion of their movement substantially parallel to said stripping members and coacting to grip and pull out the stems of unstemmed leaves left between said stripping members.

29. In a tobacco stemming machine, the combination with means for gripping and forwarding tobacco leaves, of opposed, endless, stripping members arranged to admit therebetween leaves forwarded by said means and coacting to strip the laminae from the stems of tobacco leaves held in said means, and a stem puller including stem gripping members having movement in a circular path diverging from that of the stripping member and coacting to grip and pull out the stems of unstemmed leaves left between said stripping members.

30. In a tobacco stemming machine, the combination with means for gripping and forwarding tobacco leaves, of opposed, endless, longitudinally moving members arranged to admit therebetween tobacco leaves forwarded by said means and coact to strip the laminae from the stems of leaves held in said means, and a secondary stem puller having gripping elements traveling in a circular path diverging from that of said members acting to grip and pull out axially the stems of unstemmed leaves left between said stripping members.

31. In a tobacco stemming machine, the combination with means for gripping tobacco leaves by their butts and thereby forwarding them, of opposed stripping members arranged to admit therebetween leaves forwarded by said means and coacting to strip the laminae therefrom, and a pair of opposed traveling endless surfaces arranged to admit therebetween any stems which may have broken off from their gripped butts in protruding relation to said stripping members and draw the same out from between said stripping members to strip them, said stripping members coacting to advance the broken stems into position to be gripped between said surfaces.

32. In a tobacco stemming machine, the combination with means for gripping tobacco leaves by their butts and thereby forwarding the same, of opposed endless stripping members arranged to admit therebetween leaves forwarded by said means and coacting to strip the laminae therefrom, and an auxiliary stem puller separate from said means for gripping any stems which may have broken off from their gripped butts in protruding relation to said stripping members and drawing them out of said stripping members to strip them, said stripping members coacting to advance the broken stems into position to be gripped by said stem puller.

33. In a tobacco stemming machine, the combination with means for gripping tobacco leaves by their butts and thereby forwarding them, of opposed endless stripping belts arranged to admit therebetween leaves forwarded by said means and coacting to strip the laminae therefrom, an auxiliary stem puller separate from said means for gripping any stems which may have broken off from their gripped butts, in protruding relation to said stripping members and drawing them out of said stripping members to strip them, and means imparting endwise movement to said stripping belts in a direction transverse to the length of the leaf stems to carry the broken stems sidewise into position to be gripped by said stem puller.

THOMAS R. PRIDDY.